(12) United States Patent
Jordil et al.

(10) Patent No.: US 10,082,409 B2
(45) Date of Patent: Sep. 25, 2018

(54) ABSOLUTE POSITION DETERMINATION

(71) Applicant: HEXAGON TECHNOLOGY CENTER GMBH, Heerbrugg (CH)

(72) Inventors: Pascal Jordil, Ecoteaux (CH); Robert Fritsch, Balgach (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 119 days.

(21) Appl. No.: 15/217,570

(22) Filed: Jul. 22, 2016

(65) Prior Publication Data

US 2017/0023383 A1 Jan. 26, 2017

(30) Foreign Application Priority Data

Jul. 24, 2015 (EP) .................... 15178188

(51) Int. Cl.
  *G01D 5/249* (2006.01)
  *G01D 5/26* (2006.01)
  *G01D 5/347* (2006.01)

(52) U.S. Cl.
  CPC ............. *G01D 5/26* (2013.01); *G01D 5/2497* (2013.01); *G01D 5/34792* (2013.01)

(58) Field of Classification Search
  CPC .... G01D 5/26; G01D 5/2497; G01D 5/34792; H03M 1/282; H03M 1/285
  See application file for complete search history.

(56) References Cited

U.S. PATENT DOCUMENTS

| | | | |
|---|---|---|---|
| 4,794,251 A | 12/1988 | Scholian | |
| 4,799,798 A | 1/1989 | Erb | |
| 5,173,693 A | 12/1992 | Fry | |
| 8,570,621 B2 | 10/2013 | Braasch et al. | |
| 2011/0208475 A1 | 8/2011 | Lingk | |
| 2016/0258786 A1 | 9/2016 | Fritsch et al. | |

FOREIGN PATENT DOCUMENTS

| | | |
|---|---|---|
| CH | 704584 A2 | 9/2012 |
| CN | 101476902 A | 7/2009 |
| CN | 102037332 A | 4/2011 |
| CN | 102203562 A | 9/2011 |
| DE | 37 03 327 A1 | 8/1987 |

(Continued)

OTHER PUBLICATIONS

European Search Report dated Jan. 11, 2011 as received in U.S. Appl. No. 15/178,188.

*Primary Examiner* — Thanh Luu
(74) *Attorney, Agent, or Firm* — Maschoff Brennan

(57) ABSTRACT

Some embodiments of the invention relate to an absolute code scale of an angle or linear position encoder, which is composed of a first absolute code sequence having a first primary code period length, which is periodically continued, and at least one second absolute code sequence having a second primary code period length, which is periodically continued. The first and the at least one second absolute code sequence are codeword-foreign in relation to one another in this case.

Along the absolute code scale, in each case one section from the first and one section from the at least one second absolute code sequence are successively arranged alternately and in this case the absolute code sequences are each shifted in relation to one another in the different sections from the same absolute code sequence along this arrangement.

22 Claims, 8 Drawing Sheets

(56) References Cited

FOREIGN PATENT DOCUMENTS

| | | |
|---|---|---|
| DE | 38 18 044 A1 | 11/1989 |
| DE | 689 20 123 T2 | 5/1995 |
| DE | 197 32 398 A1 | 2/1999 |
| DE | 10 2008 054042 A1 | 5/2010 |
| EP | 0 042 179 A2 | 12/1981 |
| EP | 0 268 558 A2 | 5/1988 |
| EP | 1 043 571 A1 | 10/2000 |
| EP | 3064902 A1 | 9/2016 |
| WO | 2010/049222 A1 | 5/2010 |

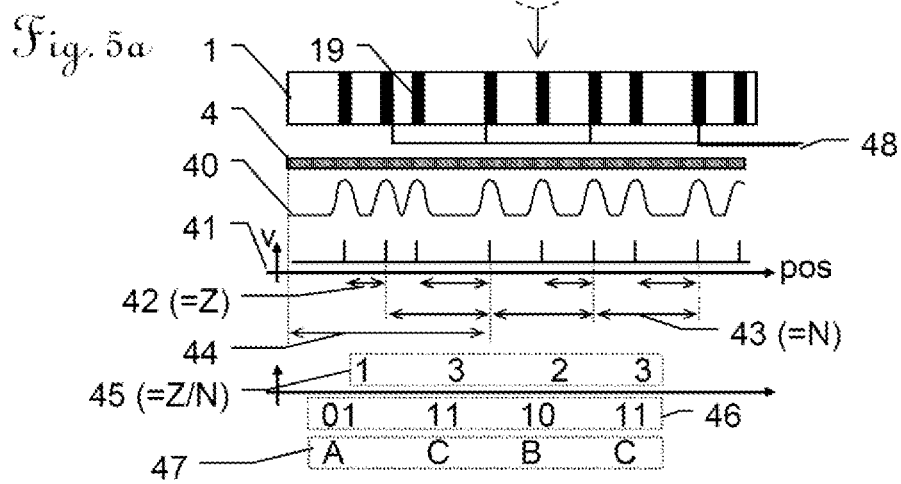
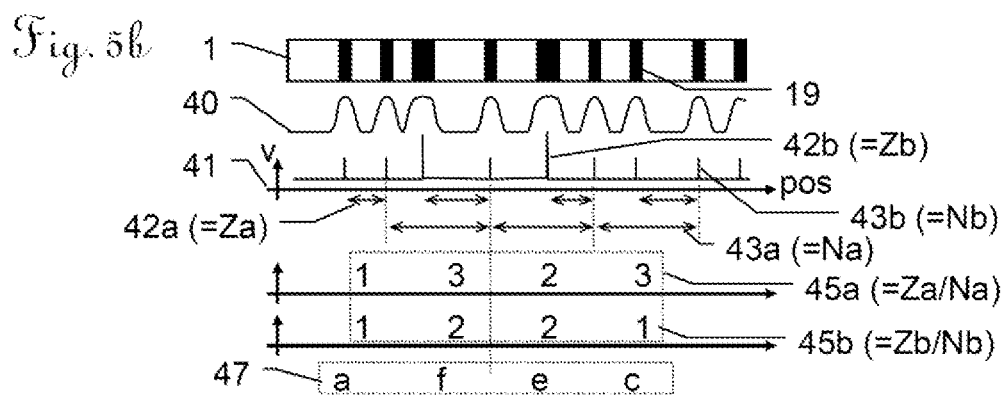
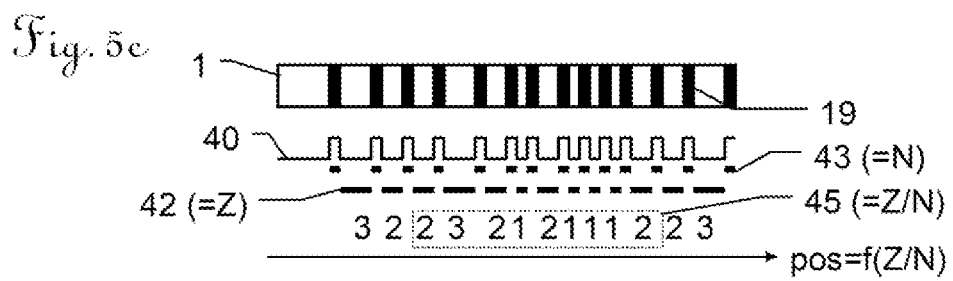

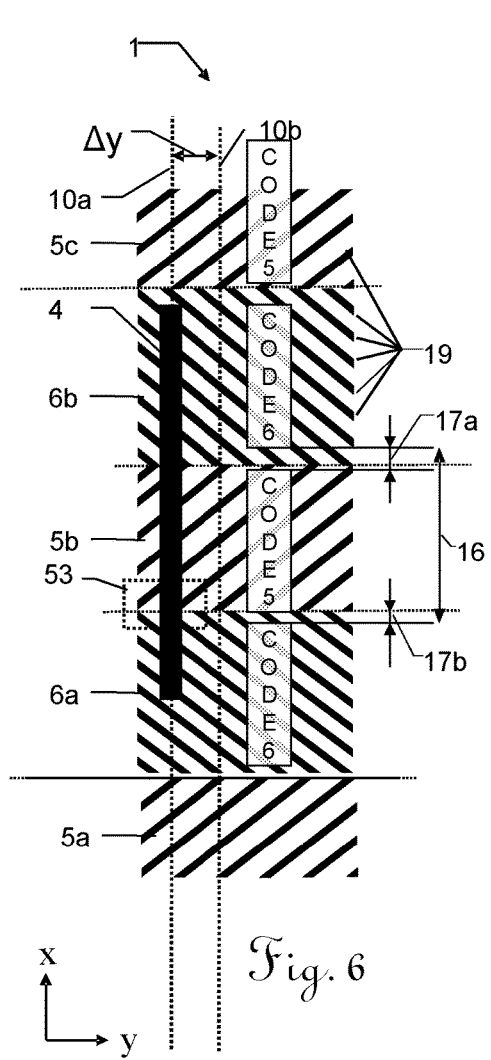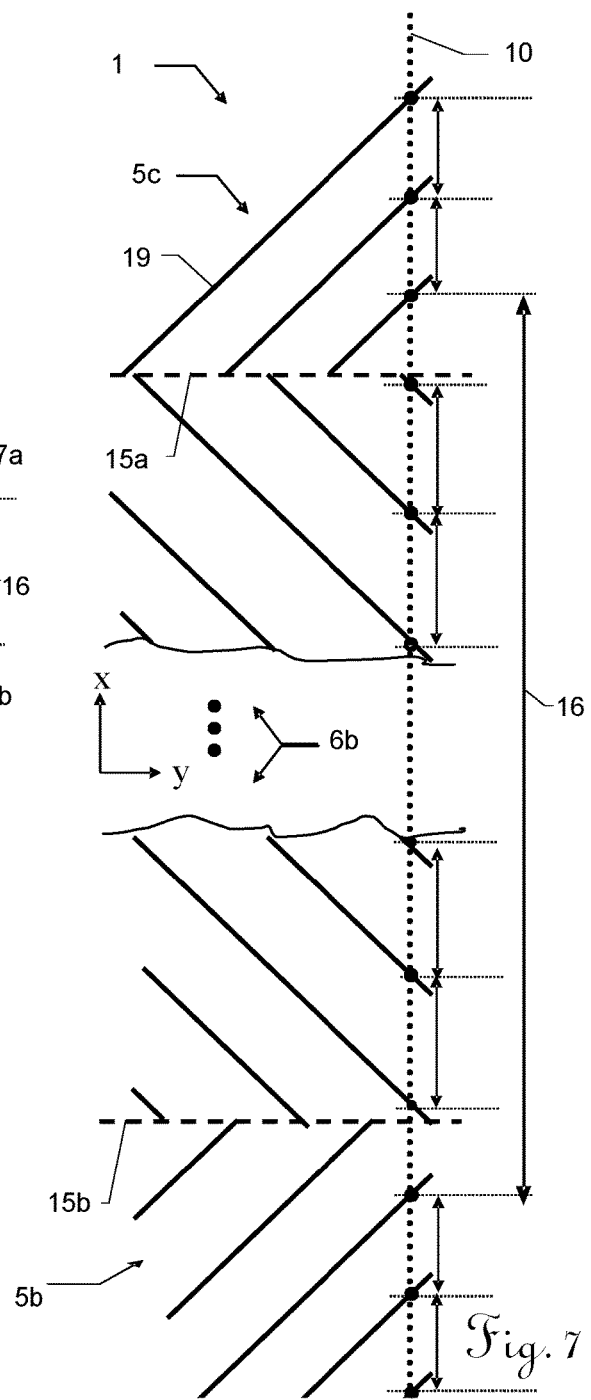

```
┌─────────────────────────────────────────────────────────────┐
│  Reading the absolute code scale using at least one linear  │
│  sensor aligned at least approximately longitudinally in    │
│  relation to the scale                                       │
│                         71                                   │
└─────────────────────────────────────────────────────────────┘
                              │
┌─────────────────────────────────────────────────────────────┐
│  Ascertaining the positions of the code marks of the         │
│  absolute code scale (and possibly further features which   │
│  form codewords), in particular with the expansion-         │
│  independent coding, and ascertaining the codewords         │
│                         72                                   │
└─────────────────────────────────────────────────────────────┘
                              │
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   Ascertaining the codewords on the basis of a
   relative relationship between geometrical code mark features
                         73
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │
┌─────────────────────────────────────────────────────────────┐
│  Assigning the codewords to a first or second absolute       │
│  code sequence on the basis of the codeword values and       │
│  the geometrical location thereof                            │
│                         74                                   │
└─────────────────────────────────────────────────────────────┘
                              │
┌─────────────────────────────────────────────────────────────┐
│  Determining a geometrical offset between two codewords     │
│  of the same absolute code sequence and determining the     │
│  absolute position on the basis of the offset                │
│                         75                                   │
└─────────────────────────────────────────────────────────────┘
                              │
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   Determining a geometrical offset between codewords from
   different absolute code sequences and determining a
   transverse shift of the code reader transversely to the
   longitudinal direction of the absolute code scale on the
   basis of different alignments in each case of the code
   marks for each of the absolute code sequences
                         76
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

*Fig. 8*

ABSOLUTE POSITION DETERMINATION

FIELD OF THE INVENTION

The invention relates to an absolute code scale of a linear position encoder and an absolute linear measurement system having such an absolute code scale and furthermore a method for preparing and reading out an absolute code scale, and also such a computer program product.

BACKGROUND

Linear measurement systems are used in the case of a linear position determination, in particular in the case of high-precision applications in the field of precision machines, coordinate measuring machines, or comparable fields of application. In some applications, measurement accuracies in the sub-millimeter range or sub-micrometer range are necessary in this case, in other applications, machines, or devices, in which the present invention can also be used, the accuracy requirements can also be in the millimeter range, however. In many of these applications, the linear measurement systems are preferably designed as absolute value linear position encoders, which provide an unambiguous, absolute position value over the entire length of the measurement range thereof.

For example, EP 0 268 558 discloses an absolute scale, which is divided into two separate, parallel scales having periodic coding of different periodicity.

DE 38 18 044 discloses a use of multiple line sensors on a subcarrier, which preferably has a coefficient of thermal expansion of zero or equal to that of the scale. The coding is designed as an interleaving of absolute and incremental coding in a shared scale.

In a coordinate measuring machine in gantry construction, for example, numerous linear sensors are used to determine the spatial position of a measurement head in multiple dimensions. In this case, the measurement ranges to be acquired can certainly be multiple meters. Therefore, appropriate absolute-coded linear measurement systems are to be provided, using which an absolute position value of a reading head in relation to a code scale is ascertainable with sufficient position resolution, and using which the entire measurement range can be absolute-coded, even with large measurement ranges. In this case, the ability to read out and analyze the code is to be kept as simple as possible.

In the case of position accuracies in the micrometer range or less, in addition to the movements in the longitudinal direction of the linear sensors, deviations in the transverse direction can also have an interfering effect on the accuracy of the ascertained spatial position of a measurement head. An effort is therefore to be made in particular to also make such parasitic effects ascertainable, for example, to be able to recognize measurement errors arising therefrom and/or compensate for them appropriately. Linear position encoder systems are thus preferably to be provided for such embodiments, using which, in addition to the primary absolute position determination thereof in the longitudinal direction along the linear encoder system, a location is determinable in a further direction deviating from the primary linear encoder measurement direction, although with a significantly restricted measurement range in relation to the primary linear measurement direction of the linear encoder, for example, with a measurement range of several millimeters or less. Thus, in an advantageous embodiment, in addition to the primary absolute position determination in the scale longitudinal direction, a determination of deviations in the transverse direction is to be sought at least in a restricted manner, for example.

For example, EP 0 042 179 discloses a system for determining positions along an advance direction, which especially enables a determination of deviations of an ideal location on the basis of a pattern having V-shaped strips. In this case, a position which is incrementally determined on the basis of a pattern is absolutely located by a further separate absolute pattern, which extends in parallel to the first pattern in the advance direction, wherein the absolute pattern codes coarse positions by means of a gray code.

DE 197 32 398 discloses the measurement of pivoting in both the X and Y directions. In addition, it describes boundary conditions for the coding.

SUMMARY

Some embodiments of the present invention can therefore be considered that of providing an improved code scale or an improved system for determining positions along a linear advance direction, using which absolute positions are determinable simply but precisely.

Some embodiments in this case are that a deviation of a position sensor out of its ideal location in relation to the code scale or the code pattern thereof is also determinable in this case, in particular a location deviation transversely to the longitudinal direction of the code scale.

Some embodiments in particular cover a long measurement range using the absolute code scale and at the same time to achieve a sufficient position resolution, in particular without requiring a complex analysis, which is susceptible to interference, in this case. In some applications it is advantageous in this case for the provided code scale to be able to divided, i.e., that multiple code scales or parts of code scales can be concatenated to be able to cover different measurement range lengths.

Some embodiments in this case also provide a code scale, which enables self-initialization solely on the basis of the code scale and without external aids (such as a high-precision interferometer, etc.).

Some embodiments in this case can also provide a code scale, which is narrow and preferably single-line in its extension transversely in relation to the coding direction, and which can be read out using an arrangement of sensors in the read unit which is aligned in the longitudinal direction of the scale.

Some embodiments of the invention also provide a code scale, the code marks of which are designed and/or will be read out such that the determination of the absolute codewords is tolerant in relation to expansions or deformations of the code scale, in particular tolerant in relation to temperature expansions in the longitudinal direction of the scale. This object can be considered in combination with or separately from the above objects.

The present invention relates to an absolute code scale of a position encoder and/or a position encoder having such an absolute code scale. In this case, this can be, for example, a linear position encoder or a rotational encoder, optionally, however, it can also be a position code scale along an arbitrary free-form path. This absolute code scale is composed of a first absolute code sequence having a first primary code period length, which is periodically continued, and at least one second absolute code sequence having a second primary code period length, which is periodically continued. In this case, the first and the at least one second absolute code sequences are differentiable and are codeword-foreign in relation to one another. In this case, the first and the second code period lengths can also be equal, however, they can also be unequal.

One section from the first absolute code sequence and one section from the at least one second absolute code sequence are successively arranged alternately in each case along the absolute code scale, and in this case the absolute code sequences are each shifted in relation to one another in the different sections from the same absolute code sequence along this arrangement, in particular phase-shifted by a different fraction in each case of the primary period length of the absolute code sequence. That is to say, for example, by in each case a different number of codewords in relation to one of the periodically repeated code sequences, which is selected as the base code sequence. The shift of the phase can thus be understood as a shift by a fraction of the base period of the periodic repetition of the code sequence.

In this case, especially the first and the at least one second absolute code sequence can each be a binary maximum sequence. In this case, in particular the first absolute code sequence and the at least one second absolute code sequence can each be a segmentation of a single maximum sequence into at least two fragments, the fragment lengths of which do not have any common divisor.

In this case, adjoining, successively arranged sections of the absolute code sequences can be formed having different alignments of the code marks coding the absolute code. In particular, for example, in each case the first absolute code sequence can be formed in the form of stroke- or bar-marks having a first angle in relation to a longitudinal direction of the absolute code scale and the at least one second absolute code sequence can be formed in the form of stroke marks having at least one second angle, which is different from the first, in relation to the longitudinal direction of the absolute code scale. Therefore, the first and at least second sections are uniquely assignable to one of the absolute code sequences on the basis of the association of the coding thereof with either the first or the at least one second absolute code sequence.

An absolute position along the absolute code scale can thus be ascertained on the basis of the shift of two portions of the same absolute code sequence (which are ascertainable as described above on the basis of the coding thereof) in relation to one another, since the shift of the identically-coded portions in the absolute code scale according to the invention is shifted in each case in relation to one another, preferably unambiguously.

In other words, the present invention can be described as follows. According to the invention, parts or regions of two or more absolute codes, for example, maximum sequences, are alternately arranged successively and with phase shifts in relation to one another. Using a read-out linear sensor, which scans or reads out along the code scale resulting in this case, an absolute position is determined on the basis of phase shifts between parts—each associated with the same absolute code.

In a refining embodiment, the code marks are formed having a different alignment in relation to the longitudinal axis of the code sequence for each of the absolute codes. On the basis of the alignment of the codes, further degrees of freedom can therefore be determined in accordance with this refinement of the invention, as will be explained in greater detail hereafter, for example. Optionally, multiple sensors can also be used for the readout in this case, in an arrangement harmonic with the code. For example, multiple line sensors are used, which are arranged successively and in parallel to the scale direction, whereby a narrow scale of, for example, 2 mm width can be used, using which nonetheless transverse deviations are ascertainable in the embodiment described here.

To be able to determine and preferably also measure the transverse direction, the code scale can be coded as described with the aid of inclined strokes, wherein the linear slope changes within a linear sensor length of the read head—the length of the acquisition range of the linear sensor is thus greater than the length of one of the parts of the absolute code, which parts are concatenated alternately and with different alignment in each case. An advantageous embodiment of the alignments is, for example, at least approximately +45° and −45°, however, other linear slopes can also be used, for example, in a range from 15° to 75°, preferably between 30° and 60°, in particular not essentially parallel to the read direction.

To obtain many usable strokes, for example, regions having equal stroke slope are analyzed on the basis of the phase shift in relation to one another during the analysis of the absolute position, wherein the lengths of the regions approximately correspond to half of the line sensor length or are shorter, for example. Within each of these regions, a periodic stroke code, for example, a binary, distance-coded code is used. The absolute position is coded on the basis of two regions of identical stroke slopes and results from the phase difference of the respective periodic codes. The phase shifts are either fixedly predefined or can be ascertained in the scope of a one-time initialization by traveling down the code scale—a self-initialization of the absolute code scale according to the invention can thus be carried out without external aids.

The absolute code scale according to the invention can be formed especially in this case in one embodiment by an arrangement of code marks on a code carrier, in which arrangement a code value of one of the code marks is formed on the basis of a ratio of a first geometrical property of the code mark in relative relationship to a second geometrical property of a second code mark. The code read unit, which is movable in relation to the code carrier, can ascertain an absolute position of the read unit in relation to the code carrier on the basis of an acquisition of a part of the number of the code marks.

The code value can thus be formed in a relative ratio of a geometrical extension of one of the code marks in relation to a geometrical distance between two of the code marks, in particular as a ratio of two widths and/or two distances of a first and a second code mark.

One single one of the code marks can optionally also be analyzed polyvalently as multi-valued in this case in relation to a plurality of the geometrical properties of this code mark, which are preferably each placed in a relative relationship.

In the linear scales discussed here, the code can be represented, for example, in that code marks are coded in the form of strokes and/or gaps of different widths and/or in the form of different distances of strokes and/or gaps. These code marks can be acquired and analyzed on the basis of greatly varying physical principles, for example:

optically, for example, in the form of strokes and gaps having different degrees of optical transmission and/or reflection, diffraction properties, spectral properties, or the like, capacitively, for example, in the form of strokes and gaps having different electrical permeabilities, conductivities and/or distances, areas, or the like, or magnetically, for example, in the form of strokes and gaps having different susceptibilities, magnetizations, distances, areas, or the like.

These strokes and/or gaps are scanned and/or imaged according to the present invention using a linear concatenation of sensors, so that the scanned code pattern is provided as electrical information, for example as an intensity profile of a section of the coding. The sensors and therefore the intensity profile are arranged in this case as line sensors, i.e., essentially coherently (i.e., in particular having at most distances required by manufacturing between the individual sensors), along a preferably at least approximately straight line. In particular, the acquisition range of a single sensor element or pixel of the sensor is at least equal in its extension in the code direction, but preferably shorter than the narrowest code mark to be acquired, for example, only a fraction thereof, i.e., approximately one-half shorter, $\frac{1}{10}$ shorter, or even smaller.

The widths and/or distances, which are to be analyzed in the readout of the coding, of the acquired code marks or code elements in the form of strokes and/or gaps are usually discretized during the determination of the read code value i.e., the read values are compared to one or more decider thresholds and in each case a discrete value located within a bandwidth of the decider threshold is assigned. The values ascertained in this case are then assembled over the sensor to form a read-out codeword. This codeword represents, for example, a part of the absolute code sequence, which is thereupon analyzed as known or as explained here to form an absolute position value.

In the event of a deformation, for example, an expansion as a result of a temperature change or a mechanical load, in the case of a code pattern along a circle, the distance of the strokes does not change, but rather the strokes and therefore the code merely travel farther outward—but the absolute positions around the circumference are not thus corrupted.

In contrast thereto, an expansion in the case of a linear scale, in which the length of the scale changes, causes a corruption of the absolute longitudinal position. If a linear scale deforms, the read-out width and/or distance values thus change in this case. During the decoding and assignment of the read-out values to a code value, which is taken from the discrete codeword alphabet used in this case, a sufficiently large distance of the ascertained value to the decider thresholds of the code assignment is required in this case to avoid a flawed readout. The decider thresholds thus have to be selected at a sufficient distance, so that even in the event of such a deviation of the distances and/or widths of the code marks from the theoretical ideal values thereof, the codewords can be correctly recognized and analyzed.

In addition, this is usually made more difficult in that linear scales are often significantly longer in the absolute length thereof than rotational encoder scales (for example, usually several centimeters of circumference in rotational encoders in relation to linear scales in lengths of decimeters up to multiple meters), and materials having greater coefficients of thermal expansion are frequently used for the linear scales (for example, metal code strips in comparison to glass code disks in rotational encoders). The fact that in the case of linear codes the expansion is incorporated directly into the measurement makes the decoding of such codes more difficult. An aspect, which also can at most be considered independently per se, of an embodiment of an absolute position coding of the invention described hereafter, which is tolerant in relation to expansions, is described hereafter. In particular, in this case this is a position coding in linear scales—however, the principle is also applicable in the same manner in rotation scales. According to this aspect, for example, higher-quality codes can also be used and/or the decider thresholds can be moved together more closely in the code recognition, and/or finer coding patterns can accordingly be used and recognized reliably. In an advantageous manner, this can be performed, for example, jointly with the above-described coding—i.e., as a special embodiment of the absolute code pattern described here—although this is not required, but rather also can be considered independently thereof.

Instead of ascertaining a codeword directly from distances or widths of the code marks of the coding, according to the design described in this exemplary embodiment of the invention, a representation of a position code is applied in which a ratio of two distances and/or widths represents a codeword. Such a code can be implemented according to the invention in the scope of the present invention alternatively to the width and distance codings based directly on absolute values, which are also applicable in another embodiment.

The codeword which is compared to decider thresholds for the analysis is in this case a ratio of a numerator to a denominator. In this case, numerator and denominator are selected such that an interfering influence in the form of a possible deformation of the code carrier acts in an at least approximately similar manner on numerator and denominator, so that the interfering influence is at least partially compensated for or shortened in the ratio calculation.

The value of the denominator is determined in a first embodiment, for example, from a distance of a regular code lattice, which represents a regular sequence of lattice pulses in the read-out signal of the scanning sensor. The value of the numerator is determined, for example, from a location of a code pulse, which is located in each case between the lattice pulses, in the read-out signal. In other words, thus from the location of the code pulse in relation to a preceding and/or a following lattice pulse or in relation to a series of multiple lattice pulses. The value of the code is thus concealed in this case in the relative ratio of numerator to denominator.

If the scale now deforms, i.e., for example, expands as a result of temperature, in this case both the pulse lattice and also the distance to the coding pulse becomes greater. The ratio of these two changes remains essentially constant in this case, however, in particular the expansion in the comparatively small spatial region of the code scale which is used for the readout of the absolute value can be considered to be at least approximately constant. In particular, the ratio used according to the invention remains more stable in the event of deformations than would be the case with the respective absolute values, from which the ratio is calculated. The distance to the decider threshold therefore also remains more stable during the decoding.

Thus, for example, if the numerator changes due to deformation by x %, the denominator thus also changes (at least approximately) by x %, whereby the changes are essentially shortened again, i.e., for example:

$$V=Z/N=Z(1+x)/N(1+x).$$

Since now a significantly lesser safety factor has to be taken into consideration to cover, for example, temperature-related variations of the read-out code values, the safety distance to the decider thresholds can accordingly be selected to be smaller in the analysis. Thus, for example, the coding can be resolved more finely, and/or a more multi-valued coding can be used. For example, instead of a binary coding, a four-value or eight-value coding can be used. With a higher-value coding, then, for example, the codeword which determines the absolute position can accordingly be represented using fewer code marks—i.e., geometrically shorter—and/or a more finely resolved coding can be used.

The fact that in the event of a temperature expansion, the absolute position of the scale, which is read out reliably according to the invention, no longer necessarily corresponds to the absolute length standard of the original meter can be compensated for, for example, numerically by means of temperature measurement and coefficients of expansion.

The invention accordingly also relates, in addition to the absolute code scale, to an absolute linear measurement system having such an absolute code scale and having at least one contactless code read unit, which has a linear, essentially coherent arrangement, which is aligned longitudinally in relation to the absolute code scale, of a plurality of, in particular optical sensor elements as a sensor line. In this case, the code read unit is designed for acquiring and analyzing the absolute code scale on the basis of physical, in particular optical intensity characteristics of the code marks forming the absolute code scale.

The code read unit can have a plurality of absolute code read regions, which are arranged harmonically in relation to the segmentation of the successively arranged portions of the absolute code scale to be read out. This means, for example, that in one embodiment, independently of the position of the sensor head along the code scale, a boundary region between a first and at least one second portion is acquirable at least twice.

The arrangement of the sensor elements of the code read unit can also be continuous, however, and at least of equal length or longer than at least one length of the longest of the portions plus at least two times a unique codeword length of the absolute code sequences. Therefore, a part sufficient for a code analysis, namely at least one complete codeword, of two portions from the same absolute code sequence is always acquirable, which two portions are phase-shifted in relation to one another according to the invention such that an item of absolute position information is ascertainable on the basis of this shift.

In the meaning of a preparation of an absolute code scale according to the invention, the invention accordingly also relates to a method for absolute coding of a code scale of a linear encoder. In this method, a first and a second absolute code sequence are provided, which are codeword-foreign in relation to one another, and periodic repetitions of the first and the second absolute code sequences, which are each offset in the code sequence direction, are provided. An alternating concatenation of sections from the respective offset first and second absolute code sequences is performed based thereon, wherein the sections are in particular greater than or equal to the unique codeword length of the respective absolute code sequences, so that a portion contains at least one item of absolute code information of the absolute code sequence.

In the meaning of an analysis of an absolute code scale according to the invention, the invention accordingly also relates to a method for reading out an absolute-coded code scale of a linear encoder, which is prepared in particular according to the above method. In this case, a part of the code scale is acquired using a linear sensor array aligned at least approximately longitudinally in relation to the code scale, codings in the acquired part are analyzed, and portions of the acquired part of the absolute-coded code scale are each assigned to one of at least two different, codeword-foreign absolute code sequences.

On the above basis, a relative location of at least two of the portions is determined, which are assigned to the same absolute code sequence, on the basis of the codings in the portions, in the form of an offset of these portions in relation to one another, and the offset ascertained in this case is used as absolute-coded position information, which uniquely reflects the position of the sensor array in relation to the code scale. To achieve a sufficient position accuracy of the position information, the absolute-coded position information can be located on the basis of a determination of a location, in particular a focal point location, of at least one of the code marks forming the coding of the portions in relation to the sensor array.

In this case, the portions can be formed from different absolute code sequences using code marks which have different known alignments in relation to a direction of the code scale, and enable a recognition of a transverse offset from a relative location of portions having different codings in relation to one another and an absolute position decoding on the basis of the known alignments thereof. Therefore, according to the invention, an embodiment of a code scale according to the invention can be applied to determine the items of location information in multiple directions.

As already described, in this method, a code value of one of the code marks forming the coding can optionally also be analyzed on the basis of a relative relationship of two geometrical properties of one or more code marks in relation to one another.

The present invention also comprises a computer program product having program code, which is provided stored on a data carrier or as an electromagnetic wave (for example, a wireless signal), which is designed to generate a code scale according to the invention. The invention also comprises such a computer program product, which is designed to analyze signals of a sensor array, which reads out a code scale according to the invention, and the program code of which is designed to ascertain an absolute position according to the present invention, in particular if a transverse offset of the code scale in relation to the code reader is additionally ascertained and/or a ratio of two acquired physical properties of the code marks in relation to a code value is analyzed. This applies especially if the computer program product is executed on a digital computer unit of a code reader or on a position determination system connected to the code reader.

BRIEF DESCRIPTION OF THE DRAWINGS

The method according to the invention and the device according to the invention are described in greater detail hereafter on the basis of specific exemplary embodiments which are schematically illustrated in the drawings solely as examples, wherein further advantages of the invention will also be described. In the specific figures:

FIG. 5 shows an illustration of an example of a code scale according to the invention on a code carrier;

FIG. 5a shows a first exemplary option of an embodiment according to the invention of a detail section of the illustration from FIG. 5;

FIG. 5b shows a second exemplary option of an embodiment according to the invention of a detail section of the illustration from FIG. 5;

FIG. 5c shows a third exemplary option of an embodiment according to the invention of a detail portion of the illustration from FIG. 5;

FIG. 6 shows an example of a first detail section of an embodiment of a code scale according to the invention;

FIG. 7 shows an example of a second detail section of an embodiment of a code scale according to the invention to explain a parallel offset recognition;

FIG. 8 shows an exemplary illustration of a simplified flow chart of a sequence according to the invention;

DETAILED DESCRIPTION

The figures are not to be considered to be to scale in this case, if not explicitly indicated. Identical or functionally similar features are provided throughout with the same reference signs, if practical, and are differentiated using a letter as an index if needed.

For easier understanding, the following statements are explained on an exemplary embodiment using a binary serial coding. The principle according to the invention can, however, be implemented in another embodiment in a similar manner using multi-value codings, in particular as is indicated as an example in one embodiment below. Alternatively, a multi-value coding can also be converted into a binary representation, or vice versa, respectively.

According to the invention, codeword-foreign sequences, which are periodically repeated, are used as the code. The repetition is preferably performed periodically at the primary period of the sequence. Examples of such codeword-foreign sequences having a primary period are, for example, maximum length sequences (MLS), which can be prepared and/or analyzed in a known manner according to formation laws of greatly varying degrees. Further examples of such or similar codeword-foreign sequences are also described, for example, in CH 704584. Optionally, pseudorandom codes (PRC) or other, for example, empirically ascertained codes, which are suitable for absolute coding, i.e., in particular have said property of the codeword-foreignness of a sufficiently long codeword of the binary sequence. As mentioned, for example, in EP 0 268 558, in addition to the use of two different codings, which are codeword-foreign in relation to one another with respect to the observed codeword length, for example, a maximum sequence having a shared formation law can also be used, which sequence is divided into two partial sequences—whereby the analysis may be simplified, for example.

Figure 1:
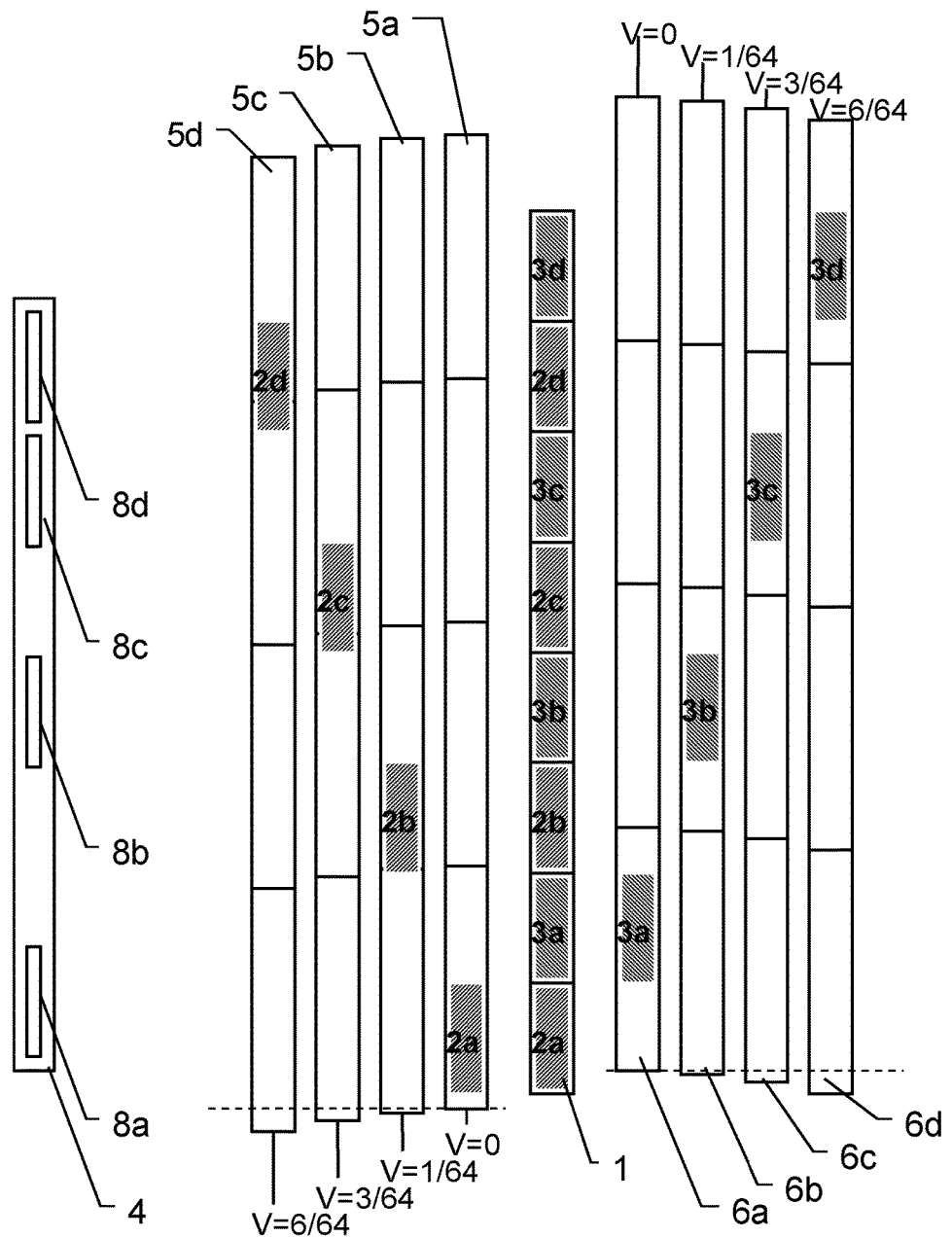
FIG. 1 shows a first exemplary embodiment of a code scale according to the invention to explain the structure and occurrence thereof.

FIG. 1 shows an example of how an embodiment of an absolute code scale 1 according to the invention can be constructed and/or can occur. The middle code strip 1 in the right part of the figure is the scale which results according to the invention and is applied, as a linear absolute code scale 1 according to the invention, by means of a code carrier or directly onto a machine component to be measured.

The four strips 5a, 5b, 5c, 5d to the left thereof contain the first periodically repeated absolute code 2, the primary period of which is represented by the black frame. From right to left, the strips 5a, 5b, 5c, 5d are each shifted in the scale direction along the absolute code scale, in particular by a fraction of the primary period length of the absolute coding. As an example, from the middle to the left, a phase shift V is shown by in each case 0/64 for strip 5a, 1/64 for strip 5b, 3/64 for strip 5c, and 6/64 of the period length for strip 5d. All strips 5a, 5b, 5c, 5d have the same absolute code in this case, except for the shift.

Of the first periodic absolute code sequences 5a, 5b, 5c, 5d shown on the left, in each case one section is used for the middle absolute code scale 1. These sections are each marked accordingly in the figure and are inscribed with 2a, 2b, 2c, and 2d. For differentiability of the first periodic absolute code in the figure, the section used thereof is shown with identical stroke slope in each case. In a special embodiment, which is explained hereafter, such a stroke slope of the code marks is additionally used for a refining effect, which is not absolutely necessary and/or does not have to be used for the aspect of the present invention described here, however.

The four right code strips 6a, 6b, 6c, 6d contain, in a similar manner to the left side, a second periodically continued absolute code 3, which is different from the first and in particular is codeword-foreign in relation thereto, and which is also shifted differently in the scale direction in each of the strips 6a, 6b, 6c, 6d. The shift can again be performed in particular by a fraction of the primary period length of this absolute code. As an example, from the middle to the right, a phase shift V is shown by in each case 0/64 for strip 6a, 1/64 for strip 6b, 3/64 for strip 6c, and 6/64 of the period length for strip 6d. For differentiability of the second periodic coding in relation to the first periodic coding in the figure—as already mentioned—this is shown in each case with stroke slope which is equal for this second absolute code sequence, and is different in relation to the first absolute code sequence. In each case a portion 3a, 3b, 3c, 3d, . . . is also used from these second absolute code sequences for the resulting absolute code scale 1 according to the invention in the middle.

The use of first and second coding is performed alternately in this case, i.e., alternately once from the left side and once from the right side. This is clearly apparent due to the different stroke slopes.

In addition, the parts used are each inscribed. In this case, the respective elements are identified with 2a, 3a, 2b, 3b, 2c, 3c, 2d, and 3d. The letter index corresponds in this example to the phase shift, the number identifies the first (=2) absolute code sequence 5 or second (=3) absolute code sequence 6 (which also corresponds here to the respective associated stroke slope for 2 or 3). However, the different stroke slope shown here would not be absolutely necessary for an absolute code readout unit for differentiating the first and second absolute code sequences, since these portions can be uniquely differentiated on the basis of the code.

In this case, a code strip 1 thus results having an alternating sequence of two different absolute code parts 5 and 6, which are each unique per se, wherein the absolute code parts from the same absolute code sequence are each (phase) shifted in relation to one another in the code direction. Both absolute code sequences can advantageously be taken from a single maximum sequence, in that it is divided into two parts of primary period lengths, as explained in EP 0 268 558, since the two resulting absolute code sequences are codeword-foreign in relation to one another in this case. In addition, in such a case the sequences can be prepared and/or analyzed according to the same formation law. Alternatively, however, arbitrary other sequences having the required properties of codeword-foreignness can also be used, for example, sequences which are developed systematically or empirically by means of suitable software.

The absolute code scale 1 shown merely shows a section of the maximum length possible according to the principle according to the invention of the absolute code sequence 1 thus arising, at which it would begin to repeat and would thus become ambiguous. The above-described procedure can be continued further with corresponding multiple left and right strips 5n and 6n.

The above principle can also be expanded to more than the two base absolute code sequences 5 and 6 shown here, for example, to three or more base absolute code sequences, which are then concatenated according to the approach according to the invention alternately and with different phase offsets.

On the very left in FIG. 1, an example of an embodiment of a code read unit 4 usable for the readout of the absolute code scale 1 according to the invention is shown, which has, for example, four separate linear readout regions 8a, 8b, 8c, 8d, using which the code marks arranged on the absolute code scale according to the above scheme are read out, and on the basis of the readout of which the absolute codes are analyzed. However, for example, a single continuous line sensor could also be used just as well, for example, a CCD line. Further details in this regard will be described at another point.

In absolute rotation encoders, a problem of the embodiment of a linear encoder described hereafter does not occur in this form, since a periodic repetition of the absolute code occurs therein with one encoder revolution as a result of the system. The absolute value range to be represented by the scale accordingly results only from the desired position resolution of one revolution. In contrast, in the case of an absolute linear scale according to the invention, no periodic repetition of the code is to occur over the entire measurement range—which is usually significantly longer than the circumference of a rotational encoder—since this would result in ambiguity, which contradicts absolute coding. The present invention provides absolute position scales, using which a length range can be absolutely coded in the case of linear scales, which is significantly longer than the base period of the absolute code sequence used.

Figure 2:
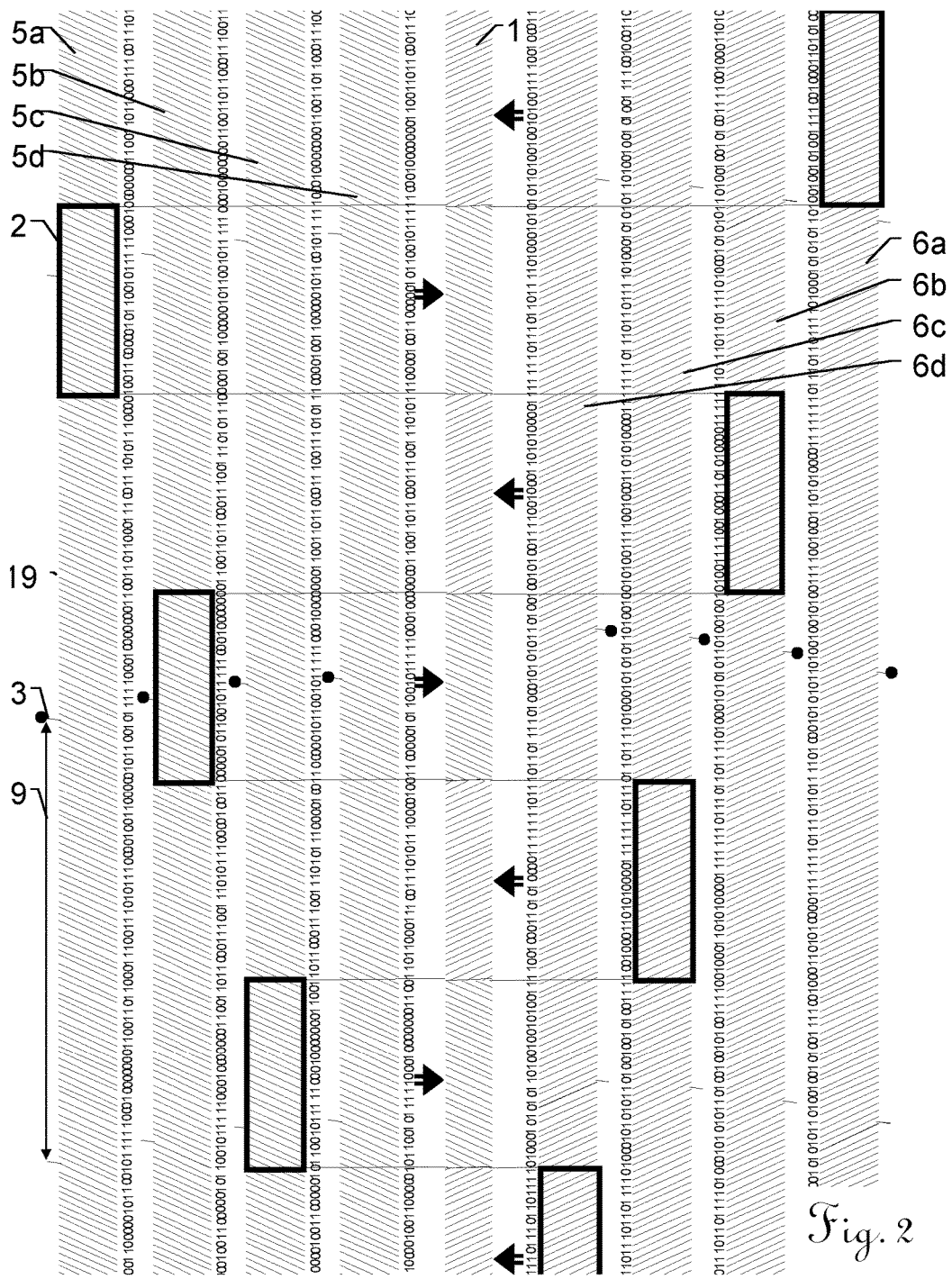
FIG. 2 shows a second example of an embodiment of a code scale according to the invention to explain the structure and occurrence thereof.

FIG. 2 illustrates once again a possible occurrence of a scale according to the invention and/or explains the analysis thereof for the absolute position determination.

The left four auxiliary scales 5a, 5b, 5c, 5d each consist of periodically continued primitive absolute codes. The primary period thereof is identified by the lateral strokes 3, which each mark beginning/end of a period which is also identified with the mass line 9. One example of possible values of a usable binary absolute code sequence is indicated in each case adjacent to the code pattern. The code marks, which are formed here, for example, as code strokes, are inclined by +45° in relation to the scale direction for this absolute code. The fourth auxiliary scale 5d from the left can be considered, for example, as a reference for all auxiliary scales 5 on the left side of the absolute code scale 1 according to the invention shown in the middle, which is finally physically fixed on the measurement object and is used for the measurement. On the left adjacent thereto, the auxiliary scale 5c is shifted downward by 1/64 period length 9 of the primitive period. Still further to the left adjacent thereto, the auxiliary scale 5b is shifted by 3/64 and on the very left auxiliary scale 5d by 6/64. Such a shift can accordingly be continued in more than the four auxiliary scales shown here as examples, as will also be explained in detail hereafter. The shift is also apparent in the figure due to the point adjacent to one of the respective code period marks 3, which delimit the primary periods. Portions of these auxiliary scales 5a, 5b, 5c, 5d, which are used for the absolute code scale 1 according to the invention, are each marked with a rectangular frame and the use thereof is symbolized with horizontal strokes and an arrow. In the example shown, every second portion of the absolute code scale 1 in the middle originates from one of the auxiliary scales 5a, 5b, 5c, 5d from the left side.

The four auxiliary scales 6a, 6b, 6c, 6d shown on the right also each consist of periodically repeated primitive portions, indicated by the lateral strokes, which each identify beginning/end of a period. The code strokes of the code marks are inclined by −45° on the right, however. The fourth auxiliary scale 6d from the right can again be considered to be a reference for all auxiliary scales on the right side. On the right adjacent thereto, the auxiliary scale 5c is shifted by 1/64 period length of the primitive period downward. On the right adjacent thereto, auxiliary scale 5b is shifted by 3/64 and auxiliary scale 5a by 6/64 on the very right. The shift is also apparent due to the point adjacent to one of the primary period marks 3. Portions of these right auxiliary scales 6a, 6b, 6c, 6d, which are used in the absolute code scale 1, are marked using a rectangular frame. Every second portion of the absolute code scale 1 in the middle originates from the right auxiliary scales 6a, 6b, 6c, 6d.

The analysis of the absolute scale 1 according to the invention is performed in this case according to a further aspect of the invention such that the absolute position is ascertained on the basis of the offset between two portions having the same absolute code sequence. The offset is introduced accordingly in a defined or known manner. This enables an absolute scale to be prepared, which is longer than the primary period of the absolute codes used. During the readout, a region of the absolute scale accordingly has to be acquired, which is longer than the longer of first or second portion in the absolute code scale 1, plus at least two times the codeword length of the absolute code required for the absolute value determination (i.e., for example, the greater degree of the first or second absolute code sequence 5 or 6). It is obvious in this case that for the readout of the absolute code, the length of the section of the absolute code sequences 5 and 6 which is used for the absolute code scale 1 according to the invention also has to be greater than or at least equal to the codeword length of the absolute code (i.e., for example, the degree of the absolute code sequence) required for the absolute value determination. Alternatively, an acquisition can also be performed using multiple linear readout regions, which are arranged offset in relation to one another in the code direction, and which are arranged such that in each case each of them acquires at least one interface between the two absolute code sequences, and a sufficient number of code marks on both sides of this interface. This sufficient number results from the fact that an absolute code sequence section has to be acquirable thereby, on the basis of which the absolute code sequence is uniquely determinable, i.e., for example, at least of the length of a unique codeword (or the degree of the absolute code sequence 5 or 6, respectively).

In a refining embodiment, additionally or alternatively to the phase offset of the portions from the same first absolute code sequence, a codeword value of the interposed second absolute code sequence can also be analyzed, and an absolute position determination can be performed on the basis of the relationship of first to second absolute code word that was read.

Using a code scale according to the invention, a self-initialization of the measurement system can also be performed by traveling down the code scale using the read head 4, i.e., in particular without external aids. The above-described concatenation of portions also enables a simple segmentation of the absolute code scale 1 according to the invention, in which, for example, prefinished code scale parts can be concatenated during the assembly, to cover the absolute length to be measured, or the code scales 1 can be cut to length as needed, respectively. The absolute code scale 1 according to the invention remains readable and unique in this case. The accuracy of the interfaces between the concatenated absolute code scale parts 1 is not highly critical in this case, at most the maximum length which can be absolutely coded, which is large according to the invention in any case, is reduced by inaccuracies.

The absolute code principle of the present invention will be explained hereafter with different alignments of the code marks in the two regions. If an ability to determine a transverse offset is neglected, as already described, this principle of the present invention, according to which the absolute position from a phase offset of two regions or portions of sections of the same first absolute code sequence in each case, which are separated by one region of sections of at least one other, second absolute code sequence, may also be implemented without such an inclined code mark, i.e., for example, with a uniform stroke slope, in particular also with strokes extending orthogonally in relation to the measurement direction. The principle, the transverse deviation determination shown here in a special embodiment, in which the transverse deviation is determined from the location of different regions, could therefore also be considered to be an independent invention taken per se.

The region position is—as explained—coded via the difference of the phasings. To eliminate the influence of the transverse deviation, the regions having equal linear slope in relation to one another are considered for the determination of the absolute coding, in the example having two alternating successive parts from two absolute codes each having different alignments of the code marks or code elements, i.e., for example, the regions having even or odd index. Since both observed regions then have the same alignment, any possible lateral shift along the code scale 1 has no effect on the relative location of these two regions in relation to one another. Therefore, the phasing of the absolute code used in the first of the regions can be determined in relation to that of the absolute code of the same alignment, but phase-shifted, in a second region, independently of the lateral position of the read head 4 transversely to the scale direction, and the absolute position in the scale direction can be determined from this phasing jointly with the read code.

In the illustrated variant shown here, for example, 64 different phases are used hereafter as an example.

The phases of the different regions from the same absolute code can be, for example:

0, 1, 3, 6, 10, 15, 21, 28, 36, 45, 55, 2, 14, 27, 41, 56, 8, 25, 43, 62, 18, 39, 61, 20, 44, 5, 31, 58, 22, 51, 17, 48, 16, 49, 19, 54, 26, 63, 37, 12, 52, 29, 7, 50, 30, 11, 57, 40, 24, 9, 59, 46, 34, 23, 13, 4, 60, 53, 47, 42, 38, 35, 33, 32, 32, 33, 35, 38, 42, 47, 53, 60, 4, 13, 23, 34, 46, 59, 9, 24, 40, 57, 11, 30, 50, 7, 29, 52, 12, 37, 63, 26, 54, 19, 49, 16, 48, 17, 51, 22, 58, 31, 5, 44, 20, 61, 39, 18, 62, 43, 25, 8, 56, 41, 27, 14, 2, 55, 45, 36, 28, 21, 15, 10, 6, 3, 1, 0

The phase differences in the above case are then:

1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63

A different type of phase sequence than the linearly increasing phasing in the above example is also usable, however.

In the embodiment of the example shown here, each of these phase differences can originate from two possible adjacent regions, which are phase-shifted by 180° in relation to one another. Since only a small part of the sequence is observed, this uncertainty is easy to assign. Optionally, for determining the uniqueness, the code from the second absolute sequence located between the two regions of the first absolute sequence analyzed here can also be used. In particular in the event of unequal length of first and second absolute sequences, in one special embodiment of the invention, an offset arising in this case of the two absolute code sequences, which results due to the different primary period lengths thereof, can be used to analyze the primary period of the combination of according to the invention of both absolute code sequences and to further extend the thus unique length which can be absolute-coded of the resulting code pattern.

In another embodiment, such a 180° uncertainty can also be avoided if it is accepted that then the maximum code strip length is only half thereof, or it is compensated for with use of a correspondingly longer coding, for example.

In a further embodiment, for example, all odd differences can be used, i.e., the differences of the phasings of every third, fifth, . . . region, which results, for example, in the sequences shown below of the phasings:

6, 9, 12, 15, 18, 21, 24, 27, 30, 33, 36, 39, 42, 45, 48, 51, 54, 57, 60, 63, 2, 5, 8, 11, 14, 17, 20, 23, 26, 29, 32, 35, 38, 41, 44, 47, 50, 53, 56, 59, 62, 1, 4, 7, 10, 13, 16, 19, 22, 25, 28, 31, 34, 37, 40, 43, 46, 49, 52, 55, 58, 61, 0, 3, 6, 9, 12, 15, 18, 21, 24, 27, 30, 33, 36, 39, 42, 45, 48, 51, 54, 57, 60, 63, 2, 5, 8, 11, 14, 17, 20, 23, 26, 29, 32, 35, 38, 41, 44, 47, 50, 53, 56, 59, 62, 1, 4, 7, 10, 13, 16, 19, 22, 25, 28, 31, 34, 37, 40, 43, 46, 49, 52, 55, 58

15, 20, 25, 30, 35, 40, 45, 50, 55, 60, 1, 6, 11, 16, 21, 26, 31, 36, 41, 46, 51, 56, 61, 2, 7, 12, 17, 22, 27, 32, 37, 42, 47, 52, 57, 62, 3, 8, 13, 18, 23, 28, 33, 38, 43, 48, 53, 58, 63, 4, 9, 14, 19, 24, 29, 34, 39, 44, 49, 54, 59, 0, 5, 10, 15, 20, 25, 30, 35, 40, 45, 50, 55, 60, 1, 6, 11, 16, 21, 26, 31, 36, 41, 46, 51, 56, 61, 2, 7, 12, 17, 22, 27, 32, 37, 42, 47, 52, 57, 62, 3, 8, 13, 18, 23, 28, 33, 38, 43, 48, 53, 58, 63, 4, 9, 14, 19, 24, 29, 34, 39, 44, 49

28, 35, 42, 49, 56, 63, 6, 13, 20, 27, 34, 41, 48, 55, 62, 5, 12, 19, 26, 33, 40, 47, 54, 61, 4, 11, 18, 25, 32, 39, 46, 53, 60, 3, 10, 17, 24, 31, 38, 45, 52, 59, 2, 9, 16, 23, 30, 37, 44, 51, 58, 1, 8, 15, 22, 29, 36, 43, 50, 57, 0, 7, 14, 21, 28, 35, 42, 49, 56, 63, 6, 13, 20, 27, 34, 41, 48, 55, 62, 5, 12, 19, 26, 33, 40, 47, 54, 61, 4, 11, 18, 25, 32, 39, 46, 53, 60, 3, 10, 17, 24, 31, 38, 45, 52, 59, 2, 9, 16, 23, 30, 37, 44, 51, 58, 1, 8, 15, 22, 29, 36

As one possible example of an embodiment having a usage of a divided maximum sequence, for example, an absolute code in the form of a binary maximum sequence of degree 7, for example, having the formation law $(x^{\wedge}7+x^{\wedge}3+x^{\wedge}2+x^{\wedge}1+1)$ can be divided, as an example, into the first binary absolute code sequence:

10010111110001000000011001101100011100111010111000001001100000101 . . .

and into the second binary absolute code sequence:
0101101001001010011110010001101010000111111101110110111101000101 . . .

In this case, in addition to those shown here as examples, other degrees, formation laws, and/or segmentation can be used, wherein in particular the degree can be oriented depending on the value range to be coded. However, the same formation law can also always be applied and only a corresponding section thereof can be used depending on the length to be coded. In particular with regard to a possible segmentation of the absolute code scale according to the invention, this can simplify the stockkeeping.

For the first absolute code sequence of the example described above, for the transverse offset determination, rising straight lines are always used to represent the code pattern on the code carrier, and falling straight lines are used for the second absolute code sequence. On the basis of the association with the first or second absolute code sequence, the regions each having equal linear slope can therefore already be identified.

The position of these regions within a period of the length of 64 can be determined on the basis of odd differences, with resolution of the 180° uncertainty, even a period of the length 128.

Using a line sensor used as an example, using which a length of, for example, 7.68 mm is acquirable, the length of two regions, for example, approximately of the same order of magnitude, can be recorded. Since regions each having equal linear slopes are coded identically, a coded length of approximately $$7.68 \text{ mm} \cdot 128 = 983 \text{ mm}$$

is thus obtained. Two base scales of the lengths $$7.60 \text{ mm} \cdot 128 = 972.80 \text{ mm and } 7.76 \text{ mm} \cdot 128 = 993.28 \text{ mm}$$

can be formed therefrom. They differ only in the scaling of the region widths.

In one special embodiment, the sections having equal linear slope can be embodied having different widths. The different period lengths of the two maximum sequences are thus compensated for. With the aid of the pulse distances selected as examples for a bit value $d_0=0$ and a bit value $d_1=1$ of $$d_0=304 \text{ μm}$$

$$d_1=338 \text{ μm}$$

the lengths of the primary periods of the first absolute code sequence are:

$$35 \cdot d_0 + 29 \cdot d_1 = 20.442 \text{ mm},$$

and of the second absolute code sequence:

$$29 \cdot d_0 + 35 \cdot d_1 = 20.646 \text{ mm}.$$

The respective phase shifts in this example, at each 1/64, are accordingly for the first absolute code sequence:

$$20.442 \text{ mm}/64 = 319.4 \text{ μm},$$

and for the second absolute code sequence:

$$20.646 \text{ mm}/64 = 322.6 \text{ μm}.$$

The following region allocations are thus obtained:

$$7.6 \text{ mm} \cdot 20.442 \text{ mm}/41.088 \text{ mm} = 64733/17120 \text{ mm} \approx 3.78 \text{ mm}$$

$$7.6 \text{ mm} \cdot 20.646 \text{ mm}/41.088 \text{ mm} = 65379/17120 \text{ mm} \approx 3.82 \text{ mm}$$

$$7.76 \text{ mm} \cdot 20.442 \text{ mm}/41.088 \text{ mm} = 330479/85600 \text{ mm} \approx 3.86 \text{ mm}$$

$$7.76 \text{ mm} \cdot 20.646 \text{ mm}/41.088 \text{ mm} = 333777/85600 \text{ mm} \approx 3.90 \text{ mm}.$$

The overall, unique length which can be absolute-coded is therefore significantly more than the length of the two individual absolute codes per se, without the analysis expenditure due to larger analysis tables or formation laws of higher order, in particular if a maximum sequence divided into fragments having shared formation law is used.

Figure 3:
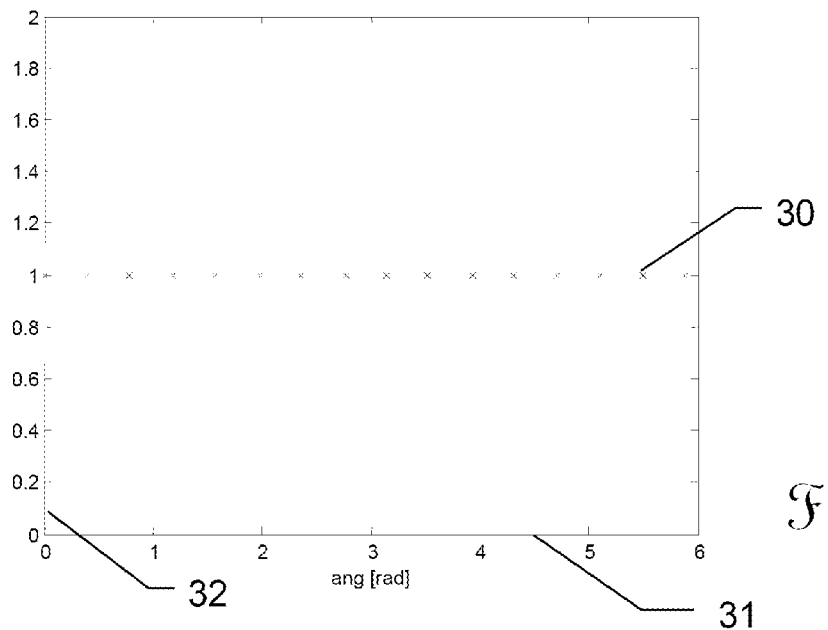
FIG. 3 shows an example of an embodiment of a design of a code scale representation according to a special aspect of the present invention in a code table angle diagram.
Figure 4:
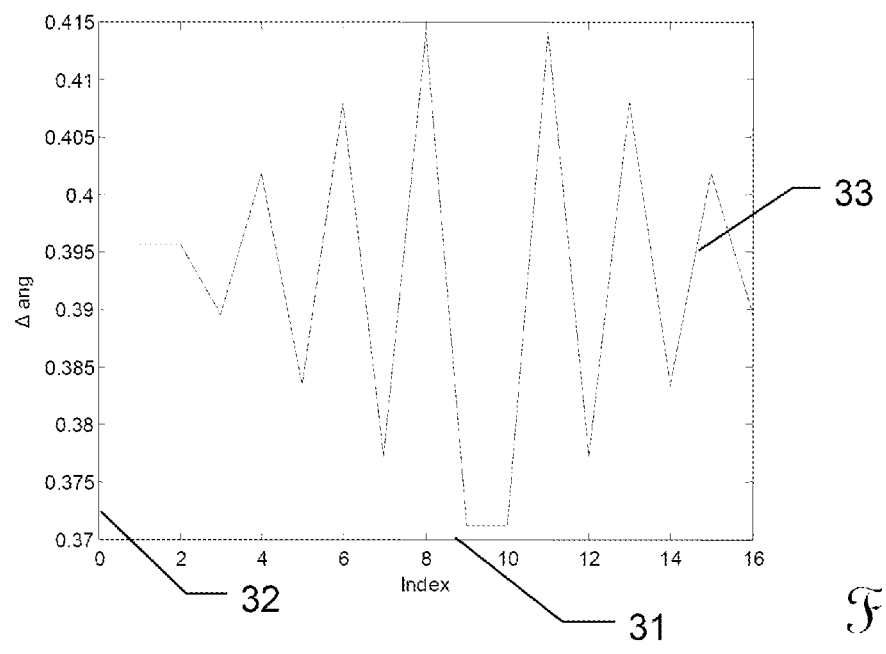
FIG. 4 shows an example of an embodiment of a design of a code scale representation according to a special aspect of the present invention in a diagram having a difference angle representation.

In a special aspect of the present invention—which is illustrated in particular in the details of FIG. 3, FIG. 4, and FIG. 5—in addition to other known embodiments, a practical embodiment of the coding—as already mentioned—can advantageously be designed such that the code values are ascertainable using an analysis of a ratio between two distances and/or widths in the case of code elements—and not in the respective absolute widths and/or distances thereof, whereby the code value determination is designed as temperature-independent in particular. In particular, the representation of the coding can be performed in the form of relative values of code mark position in relation to distances and/or widths of a fixed grid—instead of analyzing the code on the basis of respective absolute values of code mark widths or code mark distances. Since said ratio is independent of temperature expansion, in particular locally, an analysis according to this aspect of the invention is more stable and a decider threshold can be set lower in the value assignment in the scope of the detection. This enables, for example, instead of a two-value coding, the use of a, for example, four-value, eight-value, or another multi-value coding.

In other words, this aspect of the present invention—which could be considered to be a dependent embodiment of the present invention or possibly also as a separate independent invention—a position coding for a position sensor, in particular an optical absolute position code, formed by an arrangement of a plurality of code elements or code marks on a code carrier which is movable in relation to a code read unit, and using which code read unit an absolute position of the read unit is ascertainable in relation to the code carrier on the basis of an acquisition of a linear, one-dimensional portion of the position code, which is characterized in that an information content of the position coding is formed in a ratio of a first geometrical characteristic, in particular a geometrical extension of a code element and/or a distance between two code elements, of one of the code elements in relation to a second geometrical characteristic of one of the code elements.

The ratio can be in this case in particular a relative ratio of a distance between two or more of the code elements, in relation to which distance a spatial location of another code element is set in relation.

In one embodiment, for example, a fixed, in particular regular grid of code elements having code elements arranged in each case between this grid can be formed. If the periodicity of the regularity of the grid is known or ascertained, a location of the interposed code element can then be determined, which location is then, according to this aspect of the invention, set in the ratio as the numerator in relation to the distance of the grid as the denominator, and which ratio then represents the value which is compared to one or more decider thresholds for the analysis to determine a discrete value for the relevant code element, which then, per se or with discrete values of further code values, forms a codeword, which codeword indicates the absolute position and/or is used for the above-explained phase offset determination. Accordingly, multiple code elements of the grid can be incorporated in the determination of the distance of the grid, for example by interpolation or least square fit of multiple distances.

In the case shown as an example in FIG. 3 of an eight-value coding, the base grid could be, for example, at $ct0=0$
$ct2=1*pi/4$
$ct4=2*pi/4$
$ct6=3*pi/4$
$ct8=4*pi/4$
$ct10=5*pi/4$
$ct12=6*pi/4$
$ct14=7*pi/4$ and the shifted pulses therein at $ct1=1*pi/8+1*pi/1024$
$ct3=3*pi/8+3*pi/1024$
$ct5=5*pi/8+5*pi/1024$
$ct7=7*pi/8+7*pi/1024$
$ct9=9*pi/8-7*pi/1024$
$ct11=11*pi/8-5*pi/1024$
$ct13=13*pi/8-3*pi/1024$
$ct15=15*pi/8-1*pi/1024$.

In this embodiment, in each case a single code element (ct1, ct3, . . . ) is thus between two grid marks (ct0, ct2, ct2 . . . ), and a value of the code element is thus determined as a ratio of the location of (ct1)/(ct2-ct0).

In the example selected here as an illustration of a pulse distribution from FIG. 3, the angle in radians is plotted on the abscissa 31 and the pulses according to the above table are marked with crosses 30. In this case—corresponding to the low decider threshold according to the invention for this purpose, which can be used for code value recognition—a differentiation of the code values can only be made with difficulty by the naked eye. The setting of corresponding decider threshold values for determining a discrete code value can accordingly be performed in finely-structured form.

In following FIG. 4, to be able to better recognize the different pulse distances, in each case the ratio values which are used according to this aspect of the invention for analysis and code value discretization, are therefore shown. The index from the above table is plotted on the abscissa 31 and the respective angle differences in radians are plotted on the determinant 32—connected to form the curve 33—which are analyzed according to this aspect of the invention.

The read-out values of the code elements are in this example linear positions of the code elements along the read direction of the sensor of the read head. Such a linear position can be ascertained, for example, according to a threshold value principle or with a determination of a center point or focal point in the signal induced by the code element in the reading-out position sensor.

The principle according to the invention shown as an example may also be transferred in equal manner to codings of other values and executed according to this example, or also according to one of the other alternatives shown here. In this case, the value, as the number of the number of different code values (also called codeword alphabet) of the coding which can be coded using a code mark, is at least two, preferably greater than two, in particular greater than 3, greater than 7, greater than 15, or even greater. Two or more different code marks between two grid marks can optionally also be analyzed in another embodiment.

FIG. 5, FIG. 5a, FIG. 5b, and FIG. 5c show exemplary embodiments of an absolute code scale 1 according to the invention as described above, in particular in the form of examples of an embodiment option which is advantageous in several matters, which represent a special aspect of the invention, which can be considered with an absolute code scale other than the above-described absolute code scales, but if needed can also be considered as an independent invention. A section is shown of a linear absolute code scale 1 according to the invention, in which exemplary embodiment options of the circled region from FIG. 5 are shown once again zoomed out in FIGS. 5a, 5b, 5c.

For this zoomed-out region in FIG. 5a, once again the differences and the ratio values 45 analyzed according to this aspect of the invention, which are assigned using decider thresholds to corresponding code values 46 or 47, from which the code values enclosed using a frame can be formed, which then represent the unique items of absolute information of the absolute code sequence.

In the example shown here, the code marks 19 are formed as strokes, which are preferably oriented at least approximately orthogonally to the read-out direction along the absolute code scale 1 or the sensor 4. In another embodiment, the strokes can also be aligned, as shown elsewhere, diagonally in relation to the read-out direction, for example, at 30°, 45°, and/or 60°, or at an arbitrary angle in between. These strokes 19 are read out, for example, using a line sensor 4 along an essentially coherent line. Due to the linear scanning, any possible inclination of the lines from the viewpoint of the sensor 4 (except for the absolute code mark widths which change due to the inclined intersection of the acquisition direction with the code marks) is not recognizable in any case. An inclined location of the code pattern can be established at most due to the change of the width of the code marks and/or the distances thereof in the direction of the intersection line of the sensor read-out axis, the interfering influence of which is reduced or avoided in particular according to this aspect of the invention. As explained hereafter, however, in particular such a change of the width of the code marks can be used, for example, for determining tilts. The alignment of the code marks 19 shown in relation to linear code scale direction is therefore not considered to be restrictive.

As an example, an output signal 40 of the sensor 4 is shown, for example, a CCD or CMOS line in one embodiment as an optical absolute code scale in the transmitted light or incident light method. This sensor signal 4 is subjected to an analysis, in which the positions of the code marks 19 (and the grid marks 48) are determined in relation to the sensor 4. For example, a center point, focal point, peak point, beginning and end of exceeding a threshold value, etc., can be analyzed and the position thereof can be determined in relation to the sensor 4, optionally also in sub-pixel resolution of the sensor—as is shown, for example, for the case of a center point determination in the curve 41. In this case, one, or preferably multiple, of the ascertained positions of the code marks can be used for a determination of the fine position 44 of the read-out absolute codeword value explained hereafter. In particular averaging or least square fit of the acquired grid marks 48, which are known in the position thereof, can be applied in this case.

According to this aspect of the invention, relative ratios are used in the absolute code determination. In the embodiment shown here, for example, the distances 43 of the grid marks 48 as the denominator N and the distances of the code marks 19 in relation thereto as the numerator Z. The code mark value 45 then results as a ratio of numerator to denominator Z/N. These ratios 45 are compared to decider thresholds and therefore discretized to form code values 46.

Influences as a result of changes due to length changes, for example, temperature expansions or inclination of the sensor thus have no or a significantly lesser influence than if absolute values are used. The coding may therefore be analyzed more reliably or the decider thresholds may therefore be moved closer together and the code marks 19 can be read out in a more multi-valued manner, for example, tertiary as shown in the codeword 47, or multiple bits (2, 3, or more) can be coded using a single code mark. Therefore, for example, fewer code marks 19 are required to represent the absolute value codeword and accordingly fewer fine stroke divisions can be used, which can improve, for example, the manufacturing and error resistance.

Also or additionally to the above-mentioned coding of the code elements 19 on the basis of the position thereof in relation to a known grid 48, the code elements can also be coded on the basis of the width thereof, as shown in the exemplary embodiment in FIG. 5b.

The ratio, which is used according to this aspect of the invention for the analysis, can be in one such embodiment not only a relative relationship of different distances, but rather also, for example, a relative relationship of different widths of various code marks and/or a ratio of width to distance or also a ratio of distance to width, respectively.

In a further embodiment, in addition to the position of the code mark 19, the width thereof can also be analyzed as a further codeword element. In sensor signal 40, these widths are apparent, which are shown in the sensor signal analysis 41 in the two components width v and position pos. For example, with v as the area of a focal point analysis and pos as the position of the focal point. The values v and pos can also be ascertained according to other principles, however, for example, a threshold value principle, inter alia.

According to the principle of the present invention, the code value is again determined as a ratio value, i.e., in this example as a ratio of the position 42a as the numerator Za to a position 43a as the denominator Na, which results in the ratio 45a of Za/Na as the code value. In this example, a ratio of the width 42b as the numerator Zb to a width 43b as the denominator Nb is also used, which results in the ratio 45b of Zb/Nb as the code value.

Both, the distance ratio 45a and the width ratio 45b, can be combined to form a single code value for the code mark 19, whereby the code alphabet is expanded, in particular if one or both ratios are analyzed as multi-valued. A three-value coding of the position ratio 45a and a two-value coding of the width ratio 45b are shown as examples, wherein this is not to be understood as restrictive and other, in particular higher-value codings are also applicable in a similar manner for one or both of the ratios 45a and 45b. In the example shown, the code alphabet of a code mark in the absolute value codeword 47 then comprises, for example, {a, b, c, d, e, f}, in the case of an exemplary word length of the absolute code of four.

A single code mark 19 therefore codes, in this example of one embodiment, two values—a first value of its position pos, preferably in relation to a grid distance which is also metrologically determined, or to another code mark element—and in addition a second value of its width v, preferably in relation to a width of the grid marks or another code mark element. The scope of the codeword alphabet therefore results from the number of the different, in particular relative positions multiplied by the number of the different, in particular relative widths. A position determination of the code marks 19, 48 with a focal point ascertainment is particularly advantageous in this case, since in this case the width arises in any case as the area (=integral value) of the code mark in the scope of the focal point determination, in addition to the focal point position. In other words, in this embodiment, there is a two-dimensional codeword per code mark with (focal point position, volume), which is geometrically depicted one dimensionally and can be ascertained using a one-dimensional line sensor, but is two-dimensional in the value range.

In FIG. 5c, the coding is represented by different distances 42 as the numerator Z of equal-width strokes 43 as the denominator N. The code value ascertained from the ratio Z/N—i.e., from the ratio of stroke distance to stroke width—is analyzed in this example to form a more than two-value code alphabet, from which an absolute code codeword 45 is composed, in particular an absolute code scale 1 according to the invention as described above. This absolute code codeword 45 can directly code an absolute position value. However, the offset between two ascertained absolute code codewords 45, which are separate from one another, from the same absolute code sequence (in particular the phase offset in relation to the primary period of the absolute code) can also be used to code the absolute position—as was already explained according to another aspect of the invention described here.

In other words, in all examples specified here for the relative position code mark analysis, the absolute value of the position determined in this case can be determined on the basis of an analysis of one or more codeword values 47 of multiple code marks 19, in particular in the grid 48, as a coarse position. Alternatively, the absolute position determination can also be ascertained as explained from the offset of two sections of the same absolute code. A fine position can be ascertained on the basis of position of the grid 48 and/or the codeword-bearing code marks 19, which is determined in relation to the sensor element 4. In particular, an accurate position of the read head 4 in relation to the position code 1 on the code carrier can be determined in this case using focal point locations of the code elements 19, especially upon consideration of the focal point locations of multiple code marks 19 and/or grid marks 48, especially using interpolation or least square fit of the focal point locations and/or code mark widths.

Using the possibility according to the invention to be able to assign higher-value coding with high reliability to the correct codeword, for example, with the aid of a code executed in this manner, an absolute position can be coded using fewer pulses than would be possible, for example, in the case of a two-value binary coding corresponding to the prior art. In this case, in particular the local tolerance in relation to deformations achieved in this case is possible, in particular an independence with respect to expansions due to temperature variations or alignment errors of the scale in relation to the acquisition element.

FIG. 6 once again shows an outline of a section of an absolute code scale 1 according to the invention, in an embodiment using which transverse offsets Δy are also ascertainable. The code read unit 4 or, more precisely, the linear acquisition region thereof, for example, as a line sensor or an array of sensors analyzed in a single column, is shown with its read axis 10a. An offset axis 10b is shown around the transverse deviation Δy, at least approximately orthogonally to the longitudinal axis of the linear absolute code scale. Such an approximation of an at least approximately orthogonal transverse offset is sufficient in most cases, since any possible angle misalignments of the axes 10a and 10b are smaller and usually negligible as a result of the dimension ratios.

The alternating portions of the first absolute code 5a, 5b, 5c and the second absolute code 6a, 6b are clearly recognizable and differentiable from the code mark alignment thereof, but are also again explicitly inscribed with CODE5 and CODE6. According to the linear readout using the line sensor 4 as used in the invention, however, the alignments are not ascertainable per se from the sensor viewpoint, since the sensor 4 only acquires in each case the intersection regions of the code marks 19 with the sensor 4, as is illustrated in the detailed illustration in FIG. 6. In addition to the read region of the code reader 4, which is shown continuously here, it can also be broken up into multiple pieces, which are sufficiently long to acquire the absolute code value, and which can be arranged in particular harmonically in relation to the segmentation of the portions. With the aid of the code reader 4, the code values of the codings 5 and 6 and the location of the codings 5 and 6 along the sensor are ascertained. The differentiation between codings 5 or 6 is performed on the basis of an assignment of the read code values to the respective absolute codes, which are codeword-foreign. The absolute positions are determined on the basis of the offset 16 between code values from two portions of the same absolute code, i.e., for example, the offset 16 between portions 6a and 6b, the offset between 5a and 5b or between 5b and 5c. Alternatively, if the acquisition region of the sensor 4 is sufficiently long, a greater distance than, for example, an offset between 5a and 5c, or multiple offsets could also be considered.

If a transverse offset now occurs and the absolute code scale according to the invention of this embodiment is now read out along the offset axis 10b instead of along the axis 10a, as a result of the identical alignments of the code marks in the portions of the identical absolute code sequence, this does not change the ascertained offset 16 of the two identically coded portions 6a and 6b, and therefore the same longitudinal offset 16 and thus the same absolute position is also coded in the event of transverse offset Δy. However, in the event of transverse offset Δy, an offset 17a or 17b changes the read-out values of portions from different absolute code sequences, for example, between code 6a and 5b or between code 5b and 6b, since the respective code marks of the different absolute codes have different alignments. The transverse offset Δy may therefore be quantified from this offset 17a and/or 17b of different absolute code sequences 5 and 6. In this case, in addition to solely the association of the portion with one of the absolute code sequences 5 or 6, the value of the read-out codeword CODE5 and/or CODE6 can be used in the analysis.

The subregion 53 in FIG. 6, which represents the transition between two portions, is shown once again in enlarged form in FIG. 7.

Therein, the points of intersection of the code marks 19 with the read axis 10 of the read head 4 are marked with points, which are analyzed at least in the geometrical location thereof in relation to the read head 4. The value of the coding can be ascertained, for example, on the basis of the distances shown between the code marks, or another known method, in particular one of the methods described here. On the basis of the location of two identically coded portions (for example, 5b and 5c) in relation to one another, i.e., the offset or the phasing 16, which is predefined in an absolute code scale according to the invention, an item of absolute position information is ascertained, the fine position of which may be determined from the location of one or more code marks in relation to the sensor 4, in particular down to sub-pixel accuracy of the sensor 4. The offsets of differently coded portions, which extend beyond the interfaces 15a and 15b between the various portions, enable a determination of a transverse offset with the different alignments thereof.

Optionally, further degrees of freedom of the alignment of the absolute code scale according to the invention in relation to the code read unit can be ascertained, for example, similarly to the principles described in EP patent application number 15157967.

FIG. 8 shows an example of a simplified block diagram of the invention. In block 71, the absolute code scale is read using at least one linear sensor aligned at least approximately longitudinally in relation to the scale. In block 72, the positions of the code marks of the absolute code scale are ascertained. In this case, further features of the code marks which form code values can be analyzed if needed. In particular, in this case the above-described expansion-independent coding and the corresponding ascertainment of the code values can be applied.

An ascertainment of the code values on the basis of a relative relationship between geometrical code mark features is shown in block 73. In block 74, the code values are assigned to a first or second absolute code sequence on the basis of the codeword values and the geometrical location of the codewords in relation to the sensor is determined. In block 75, a geometrical offset between two code values from the same absolute code sequence is determined and an absolute position is determined on the basis of this offset therefrom.

Optionally, in block 76, a geometrical offset is determined between codewords from different absolute code sequences, and therefrom a transverse offset of the code reader transversely to the longitudinal direction of the code scale is determined based on the different alignments in each case of the code marks for each of the absolute code sequences.

Figure 9:
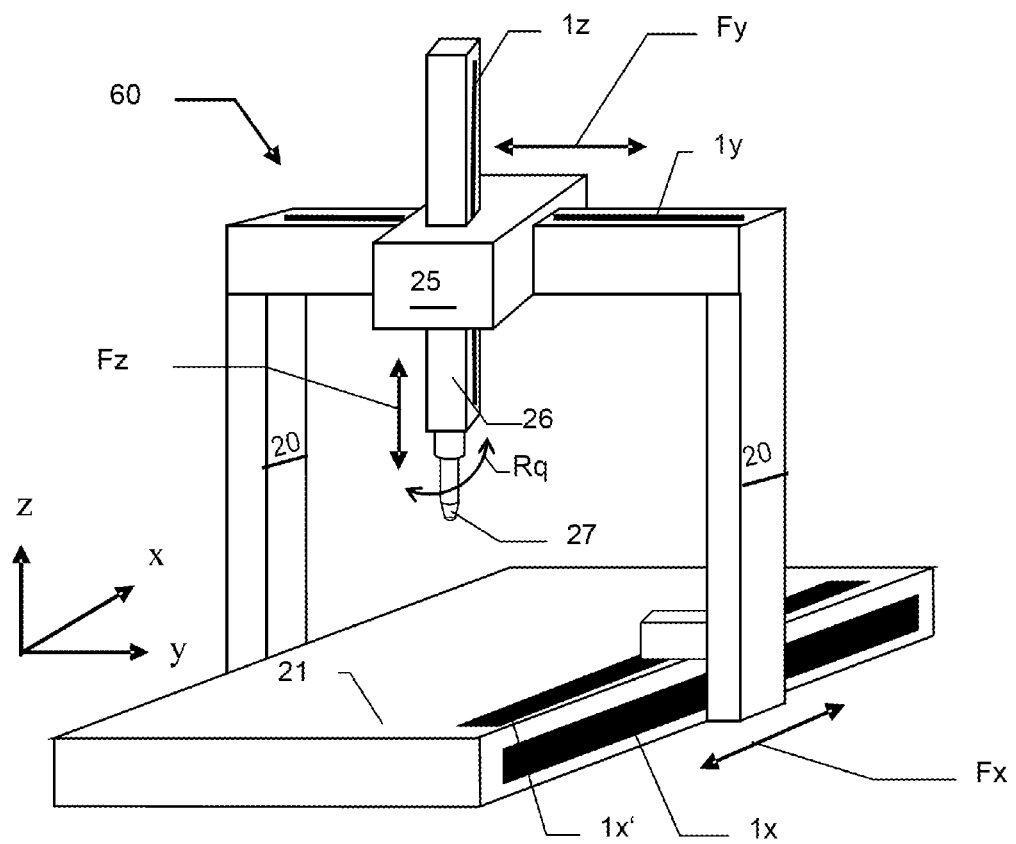
FIG. 9 shows an exemplary embodiment of the invention in a coordinate measuring machine.

FIG. 9 shows an example of an embodiment having at least one code scale 1x, 1x', 1y, 1z according to the invention in the form of a coordinate measurement machine 60, which is outlined as an example, in gantry construction. At least one of the code scales 1x, 1x', 1y, 1z shown therein, which is attached indirectly via a code carrier or directly on fixed or moving components 21, 20, 25, 26, 27 of the machine, is embodied according to the invention. By means of this position encoder, the spatial position of the measurement head 27 is determined, on the basis of which a workpiece (not shown here) is measured in the direction of the spatial coordinates Fx, Fy, Fz, Rq shown as examples. In particular in the embodiment in which a possible lateral offset and/or a tilting of the code reader in relation to the code scale according to the invention is ascertainable, possible misalignments can be detected and/or numerically or mechanically compensated for in this case. In addition—as described—in the optional, special embodiment, the code scale according to the invention can be embodied such that the readout of the code also takes place in an error-free manner in the event of possible temperature expansions of the code scale.

Further embodiments, details, and feature combinations of the present invention, which are not explicitly specified here in the examples, as are claimed in the patent claims, are routine to a person skilled in the art.

Figure 10:
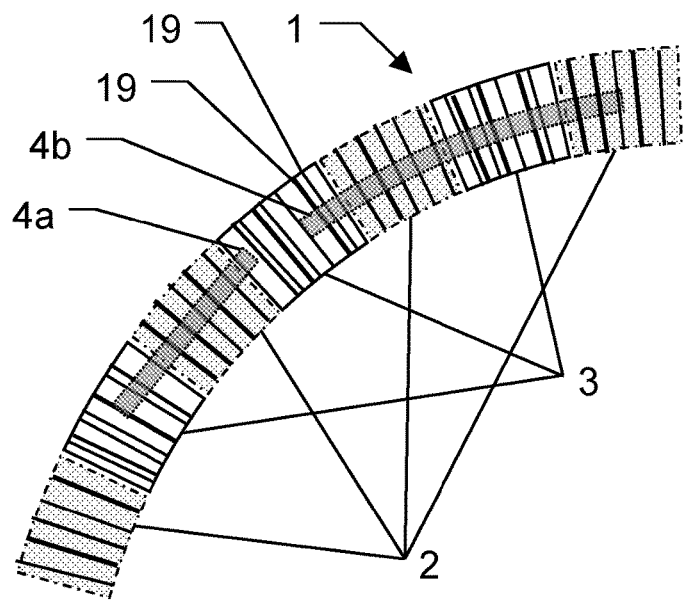
FIG. 10 shows an exemplary embodiment of the invention having nonlinear absolute code scale.
Figure 11:
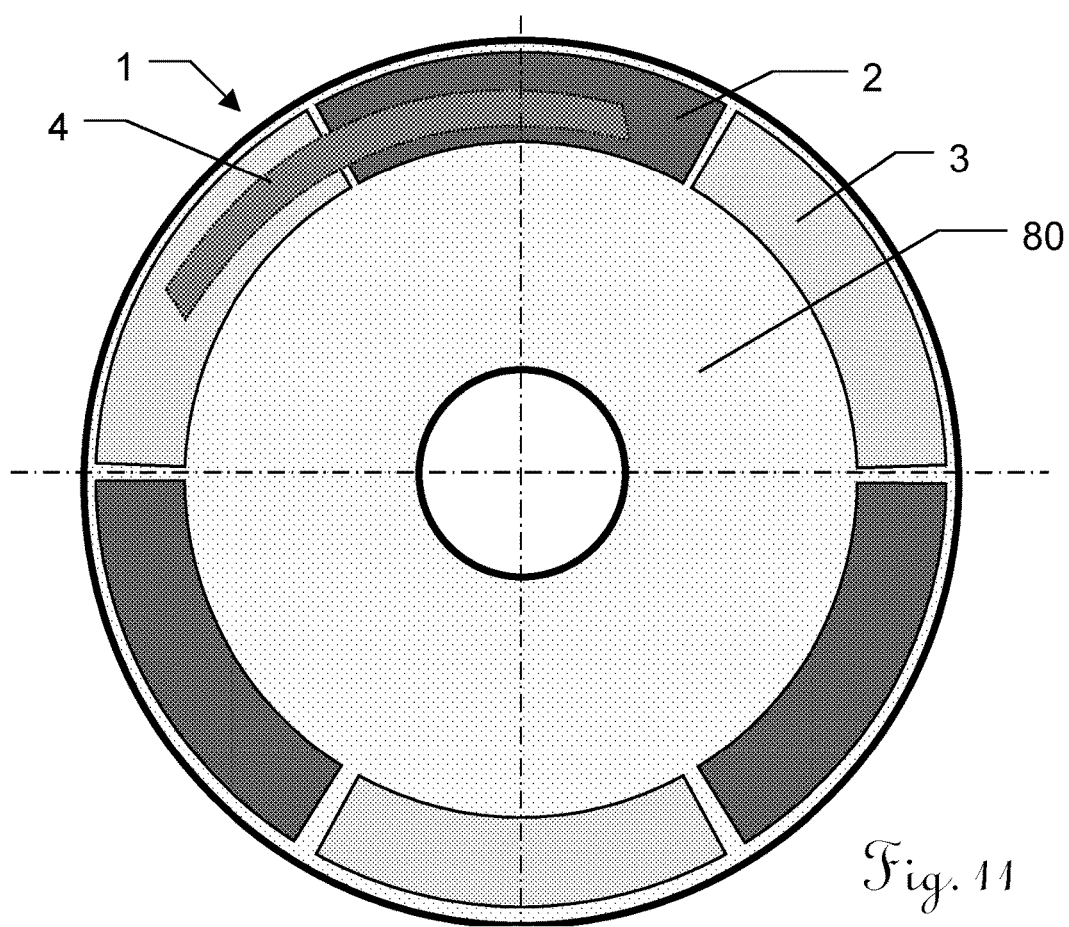
FIG. 11 shows an exemplary embodiment of the invention in the form of a rotational encoder.

The above-described absolute code scales according to the invention and the special embodiments thereof may, in the event of nonlinear arrangement, optionally also be applied similarly in non-strictly linear position encoders, for example, also in angle encoders. Exemplary examples are shown in FIG. 10 and FIG. 11. One such special embodiment, which is applied multiple times, can be formed, for example, in this case in that in the statements in the above description, the term "linear" is replaced by "angle" and the code scale is closed to form a circle in such a manner that two different absolute code sequences or absolute code sequence parts also abut one another at the interface of beginning and end—i.e., the absolute code sequences are arranged alternately over the entire analyzed circumferential region of the rotational encoder. For example, a code carrier 80, which bears the absolute code scale according to the invention in an arrangement in the form of a circular ring segment, can be designed such that different sections of a first absolute code sequence 5 and a second absolute code sequence 6 are each alternately concatenated in angle segments (for example, of at least approximately equal size) along the circumference.

One or more read heads 4a, 4b are each formed with a plurality of sensor elements for acquiring the physical features of the code marks 19 to be analyzed, which read heads are arranged such that using them the transition points from the first absolute code sequence 5 to the second absolute code sequence 6 are acquirable thereby, so that the shift according to the invention of two partial portions of the same absolute code sequences in relation to one another are acquirable. This shift codes an item of absolute position information according to the invention, in particular in a similar manner as was already explained above on the basis of a linear coding. The code sequences can be assigned in this case on the basis of the unambiguous association of the code values thereof to one of the absolute code sequences.

In this case, as shown in the acquisition region 4b, the code acquisition can be performed using an arrangement of sensor elements along a circular arc. However, a linear arrangement of sensor elements as in the acquisition region 4a can also be used. In the case of a linear acquisition element, either a linear chord part of the curved code profile can be performed. In this case, in particular using the above-described ascertainment of the code values on the basis of relative ratios between the code marks, a possible distortion as a result of the different profile or an oblique intersection of the code marks can be at least partially compensated for, so that sufficiently robust code value recognition of single value or multi-value codings is achieved. In the case of a linear acquisition element, alternatively or additionally, imaging or projection of a curved circular ring segment of the code scale on a linear sensor can also be performed by means of optical components, so that the curvature is at least partially compensated for. In an above-described embodiment, in which the code values are contained in the form of relative ratios of the geometrical embodiment of the code marks, it is advantageous in particular in this case, since in this case an acquisition of the curved code scale using a straight, linear sensor element, by local analysis in each case of the relative relationships of the acquired properties of the code marks, the distortions of the acquired code marks induced by the different curvatures of code and acquisition element also does not impair the code value ascertainment.

In this case, the above-described aspect of the different alignment of the respective code marks can also be implemented for each of the absolute code sequences, and therefore, for example, a lateral offset, staggering, eccentricity, or other misalignments can be detected and/or quantified, as was already described on the basis of a linear encoder and the counterpart of a lateral offset and/or a vertical offset.

According to the invention, an absolute code scale 1 of a rotational encoder can thus also be formed, which is composed of a first absolute code sequence 5, having a first primary code period length, which is periodically continued, and at least one second absolute code sequence 6 having a second primary code period length, which is periodically continued. In this case, the first and the at least one second absolute code sequences 5 and 6 are codeword-foreign in relation to one another.

In this case, alternately one section 2 from the first absolute code sequence 5 and one section 3 from the at least one second absolute code sequence 6 are each arranged successively along the absolute code scale 1, wherein the absolute code sequences 5/6 are each shifted in relation to one another in the different sections ⅔ from the same absolute code sequence 5/6. In particular, in this case the absolute code sequences in the sections from the same sequences are phase-shifted by a different fraction in each case of the primary period length of the absolute code sequence 5/6. Embodiments and refinements according to the invention were already explained above on the basis of linear or curved examples, wherein these do not necessarily have to be restricted to the respective exemplary embodiment.

What is claimed is:

1. An absolute code scale of a position encoder, comprising:
   a first absolute code sequence having a first primary code period length, which code sequence is periodically continued, and
   at least one second absolute code sequence having a second primary code period length, which code sequence is periodically continued,
   wherein the first absolute code sequence and the at least one second absolute code sequence have different codewords in relation to one another, and
   wherein alternately one section from the first absolute code sequence and one section from the at least one second absolute code sequence are successively arranged along the absolute code scale, and
   wherein, in the different sections from the same absolute code sequence, the absolute code sequences are shifted differently in relation to one another along this arrangement.

2. The absolute code scale according to claim 1, wherein the absolute code sequences are phase-shifted by a different fraction of the primary period length of the absolute code sequence.

3. The absolute code scale according to claim 1, wherein the absolute code scale comprises a linear position encoder or a rotational encoder.

4. The absolute code scale according to claim 1, wherein:
   the first absolute code sequence and the at least one second absolute code sequence are each a binary maximum length sequence, wherein the first absolute code sequence and the at least one second absolute code sequence are each a segmentation of a single maximum sequence into at least two fragments, the fragment lengths of which do not have any common divisors.

5. The absolute code scale according to claim 1, wherein:
   adjoining, successively arranged sections of the absolute code sequences are formed having different alignments of code marks which are coding the absolute code,
   wherein in each case the first absolute code sequence is formed in the form of bar-marks having a first angle in relation to a longitudinal direction of the absolute code scale and the at least one second absolute code sequence is formed in the form of bar-marks having at least one second angle, which is different from the first, in relation to the longitudinal direction of the absolute code scale, wherein the first sections and at least second sections are assignable to the first absolute code sequence or to the at least one second absolute code sequence, on basis of an affiliation of the read code.

6. The absolute code scale according to claim 5, wherein: the code value is formed in a relative ratio of two distances of a first and second code mark in relation to a geometrical distance between two of the code marks.

7. The absolute code scale according to claim 5, wherein: the code value is formed in a relative ratio of two widths a geometrical extent of one of the code marks in relation to a geometrical distance between two of the code marks.

8. The absolute linear measurement system according to claim 7, wherein:
the code read unit has a plurality of absolute code read regions, which are arranged harmonically in relation to a segmentation of the successively arranged sections of the absolute code scale to be read out.

9. The absolute linear measurement system according to claim 7, wherein:
the arrangement of the sensor elements of the code read unit is at least of equal length or longer than at least one length of the longest of the sections, plus two times a unique codeword length of the absolute code sequences.

10. The absolute code scale according to claim 1, wherein: an absolute position along the absolute code scale is ascertainable on basis of the shift of two sections of the same absolute code sequence in relation to one another.

11. The absolute code scale according to claim 1, wherein: it is formed by an arrangement of code marks on a code carrier, in which arrangement a code value of one of the code marks is formed on the basis of a ratio of a first geometrical property of the code mark in relative relationship to a second geometrical property of a second code mark,
wherein the code carrier is movable in relation to a code read unit and an absolute position of the read unit in relation to the code carrier is ascertainable using the code read unit on basis of an acquisition of a part of the number of the code marks.

12. The absolute code scale according to claim 1, wherein: the code marks are evaluated polyvalently with respect to a plurality of their geometrical properties in relationship to each other.

13. An absolute linear measurement system having an absolute code scale according to claim 1, and
at least one contactless code read unit having a linear, substantially coherent arrangement, which is aligned substantially longitudinally to the absolute code scale, of a plurality of sensor elements,
wherein the code read unit is designed to acquire and evaluate the absolute code scale on the basis of physical characteristics of code marks of the absolute code scale.

14. The absolute linear measurement system according to claim 13, wherein:
the plurality of sensor elements comprises optical sensor elements.

15. The absolute linear measurement system according to claim 13, wherein:
the physical characteristics of code marks comprise an intensity.

16. A method for absolute coding of a code scale of a linear encoder or a rotational encoder, comprising:
providing a first absolute code sequence and a second absolute code sequence, which have different codewords in relation to one another,
providing periodic repetitions of the first and the second absolute code sequences, which are each offset in the code sequence direction, and
an alternating concatenating of sections from the respective offset first and second absolute code sequences,
wherein the sections are greater than or equal to the unique codeword length of the respective absolute code sequences.

17. A method for reading out an absolute-coded code scale of a linear encoder or rotational encoder, comprising:
acquiring a part of the code scale using a linear sensor array aligned at least substantially longitudinally in relation to the code scale,
evaluating a coding in the acquired part and assigning portions of the acquired part of the absolute-coded code scale to one of at least two different absolute code sequences that have different codewords, and
determining a relative location of at least two of the portions, which portions are assigned to the same absolute code sequence, on the basis of the codings in the portions, by an offset of the portions in relation to one another, and
utilizing the offset as an absolute-coded position information of the sensor array in relation to the code scale.

18. The method according to claim 17, wherein, further comprising:
locating of the absolute-coded position information on basis of a determining of a location of at least one code mark which forms the coding, in relation to the sensor array.

19. The method according to claim 18, wherein the location comprises a focal point location.

20. The method according to claim 17, wherein:
the portions from different absolute code sequences are formed using code marks which have different known alignments in relation to a direction of the code scale, and
a recognition of a transverse offset is performed from a relative location of portions having different codings in relation to one another and on the basis of the known alignments thereof.

21. The method according to claim 17, wherein:
an evaluation of a code value of the code marks, which are forming the coding, is performed on basis of a relative relationship of two geometrical properties of one or more code marks in relation to one another.

22. A non-transitory computer program product having program code, which is provided stored on a data carrier or as an electromagnetic wave, and which is designed to execute a method according to claim 17 on a digital computer.

* * * * *